W. P. McGEOUCH.
APPARATUS FOR TREATING RUBBER ARTICLES.
APPLICATION FILED DEC. 23, 1915.

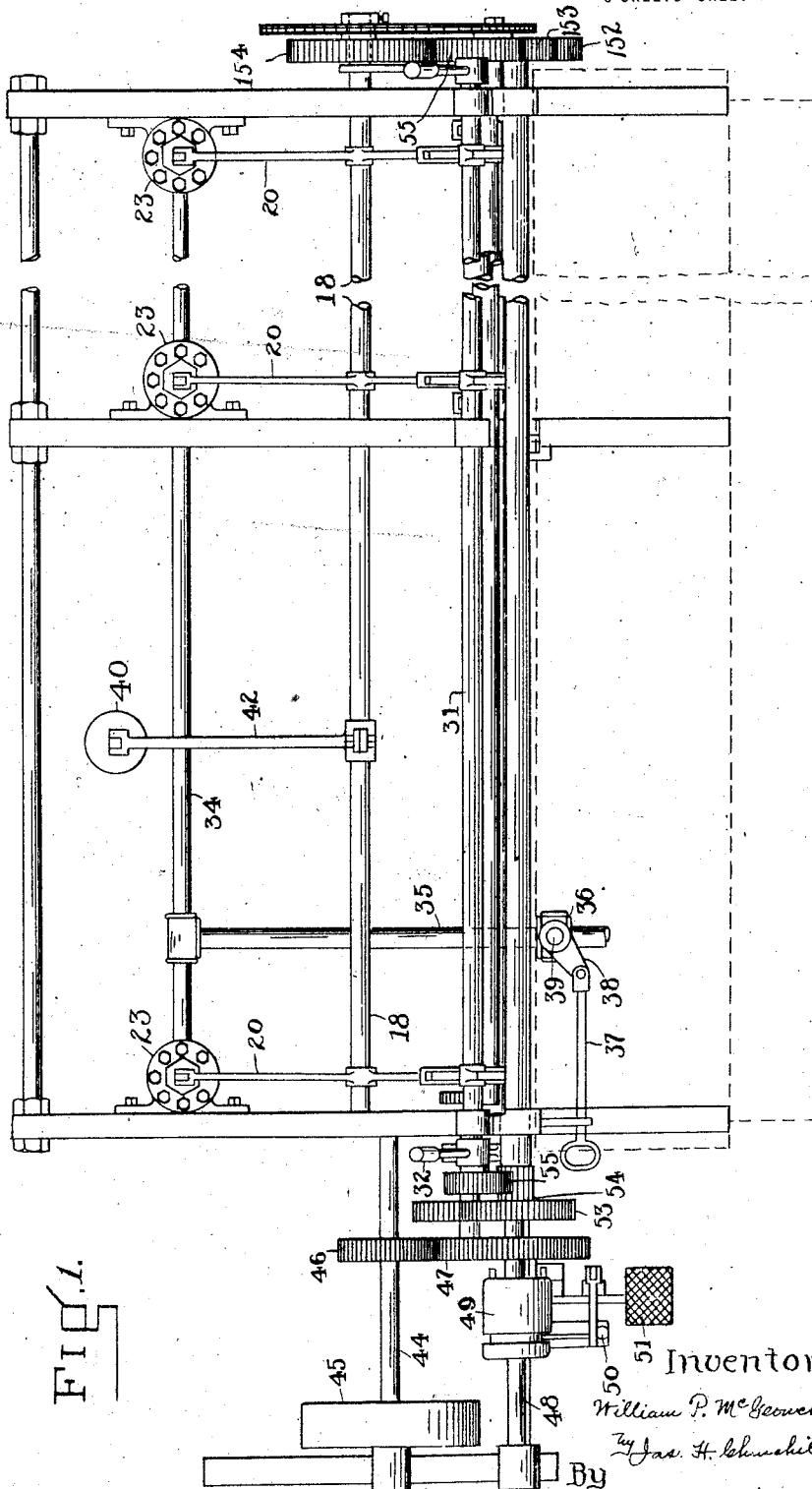

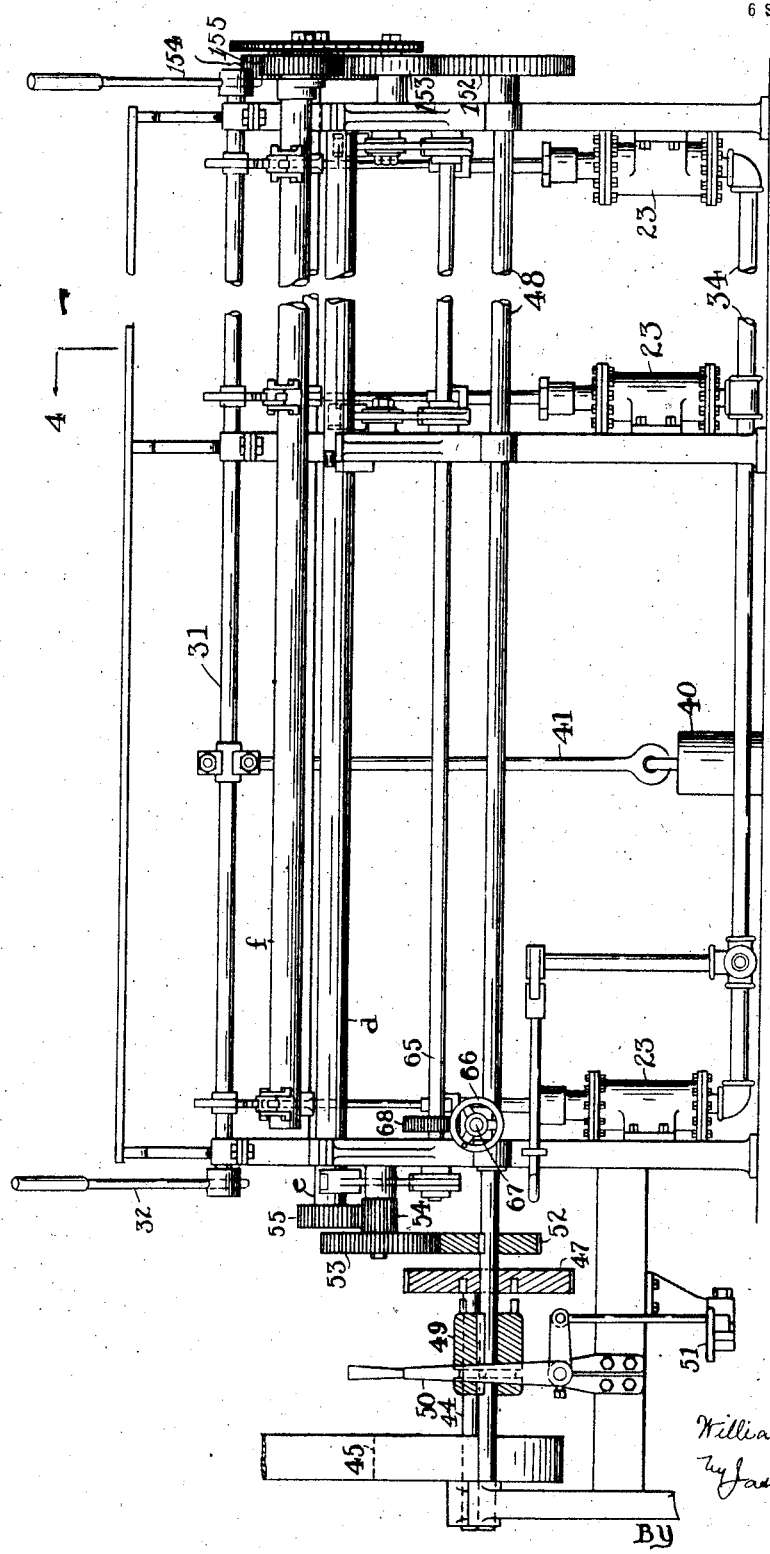

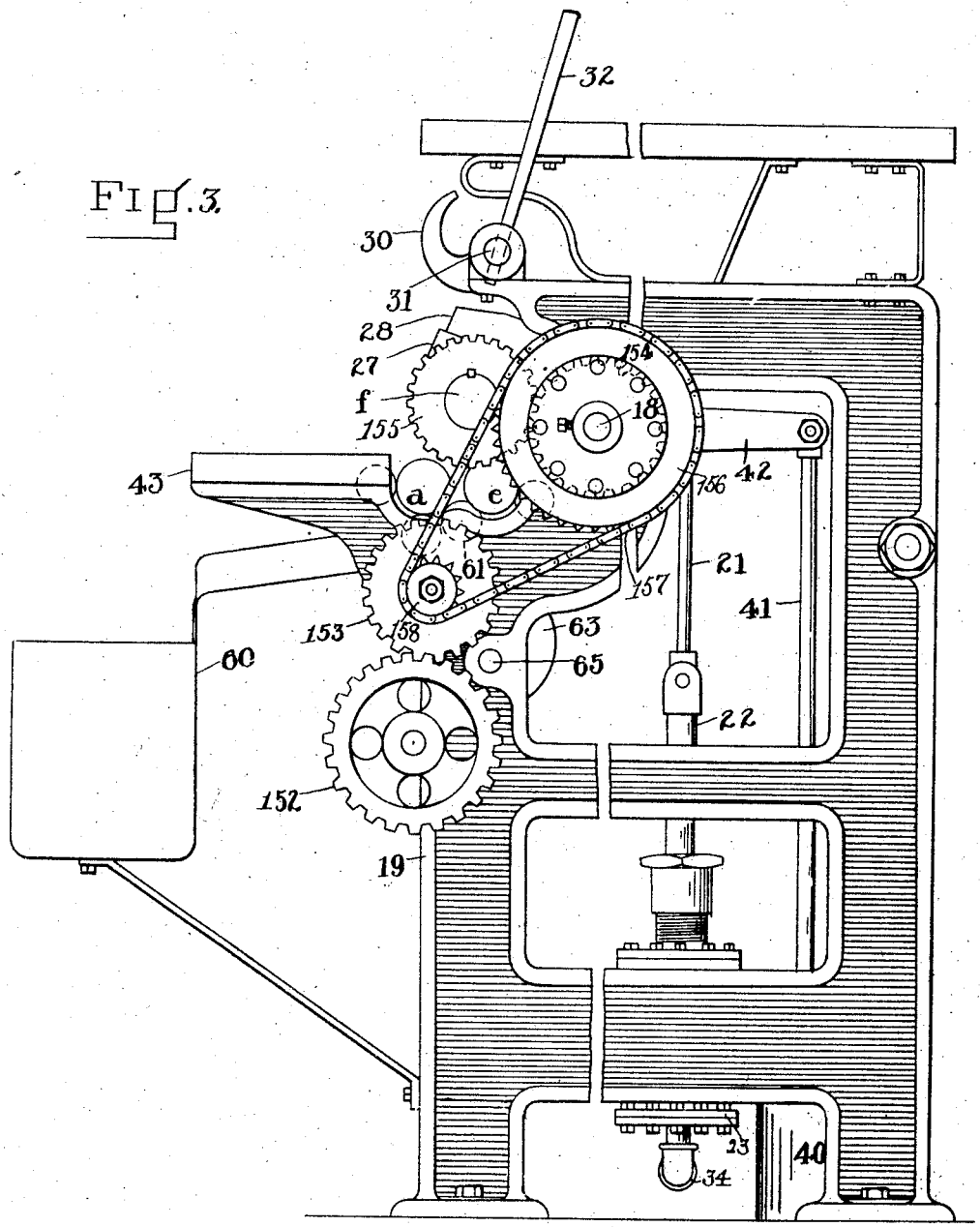

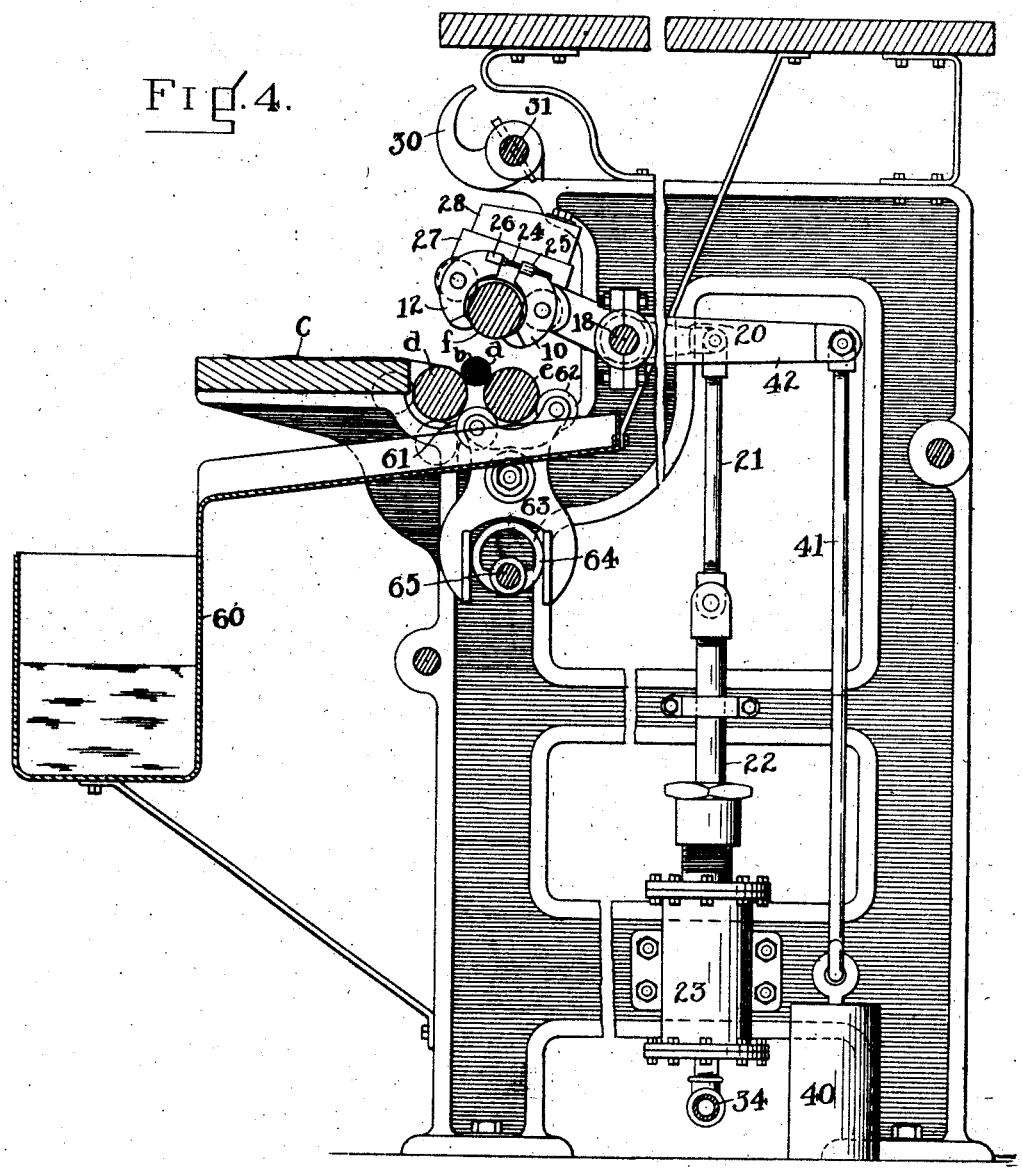

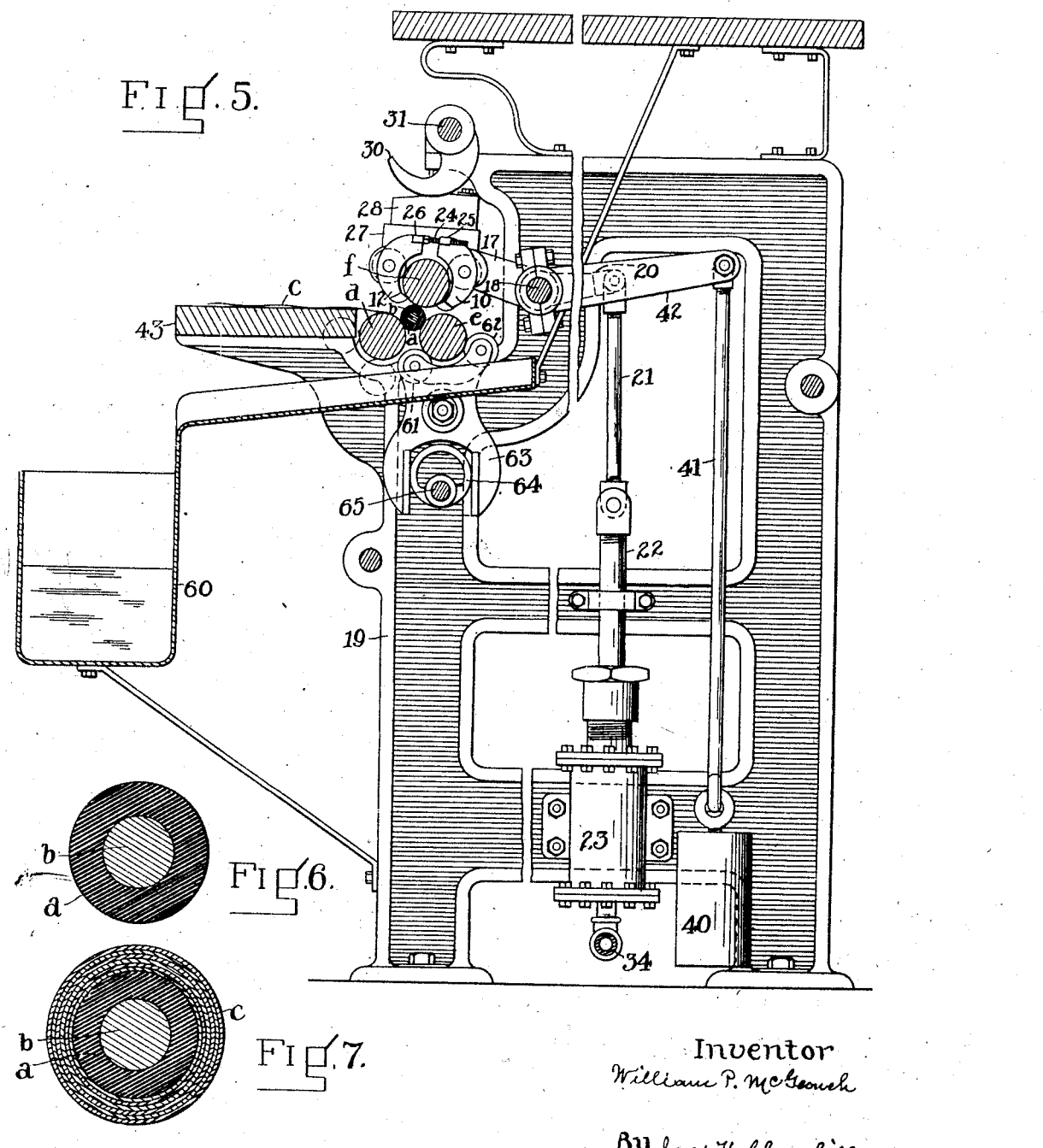

1,213,665.

Patented Jan. 23, 1917.
6 SHEETS—SHEET 6.

Inventor
William P. McGeouch
By Jas. H. Churchill
Attorney

UNITED STATES PATENT OFFICE.

WILLIAM P. McGEOUCH, OF ARLINGTON, MASSACHUSETTS, ASSIGNOR TO BOSTON WOVEN HOSE & RUBBER CO., OF CAMBRIDGE, MASSACHUSETTS, A CORPORATION OF MASSACHUSETTS.

APPARATUS FOR TREATING RUBBER ARTICLES.

1,213,665.   Specification of Letters Patent.   Patented Jan. 23, 1917.

Application filed December 23, 1915. Serial No. 68,433.

*To all whom it may concern:*

Be it known that I, WILLIAM P. McGEOUCH, a citizen of the United States, and a resident of Arlington, in the county of Middlesex and State of Massachusetts, have invented an Improvement in Apparatus for Treating Rubber Articles, of which the following description, in connection with the accompanying drawings, is a specification, like characters on the drawings representing like parts.

This invention relates to an apparatus for treating articles of rubber or compositions of rubber in an unvulcanized state, and especially substantially long lengths of hollow rubber articles, such for instance as garden or like hose, whereby a superior article may be obtained, as will be described. To this end, the article of rubber or like material before it is vulcanized, has wound upon it a wrapper of cloth or other flexible material, and while being so wound, the article is subjected to a substantially great pressure to compress, compact and solidify the interior of the rubber or like article, while at the same time the exterior surface thereof has imparted to it a smoother and more finished appearance.

The invention is especially applicable for making garden hose, and, in the present instance, I have shown an apparatus for treating substantially long lengths of garden hose.

The apparatus herein shown as embodying the invention, consists of a plurality of rollers for wrapping a layer of cloth or other flexible material around the unvulcanized rubber sleeve upon a mandrel or core, and means coöperating with one of said rollers to maintain it in a fixed position with relation to the other rollers and thereby cause an external pressure to be exerted upon the rubber sleeve, which pressure increases as the cloth wrapper on said rubber sleeve increases in thickness, as will be described.

Provision is made for varying the external pressure upon the rubber sleeve.

These and other features of this invention will be pointed out in the claims at the end of this specification.

Figure 8:
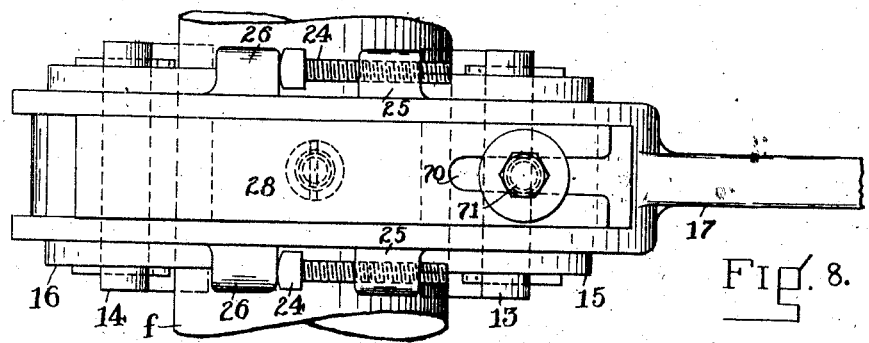
Figure 9:
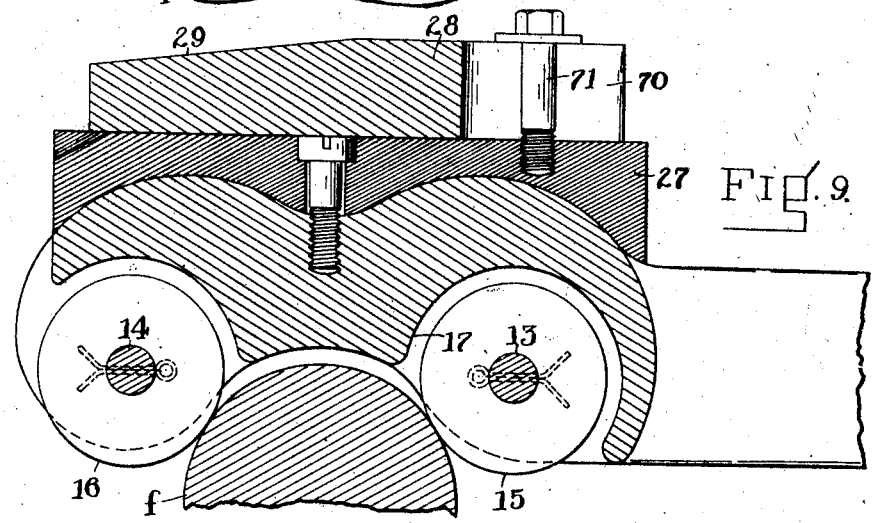
Figure 10:
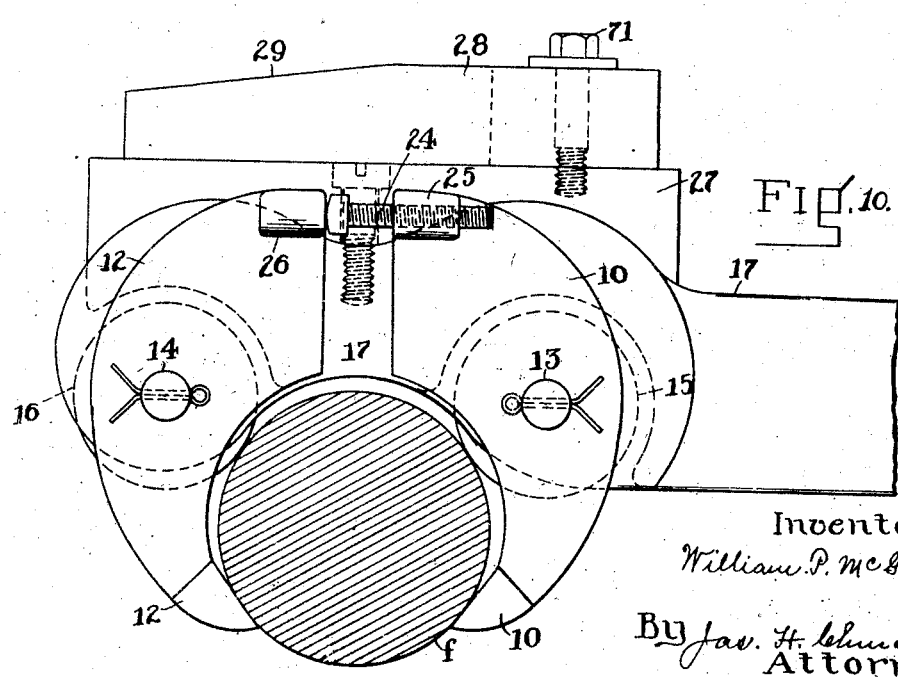

Figure 1 is a plan view of an apparatus with which to produce garden or like hose in accordance with this invention. Fig. 2, a front elevation with parts in section of the apparatus shown in Fig. 1. Fig. 3, an end elevation of the apparatus shown in Fig. 1. Figs. 4 and 5, sections taken on the line 4—4, Fig. 2. Figs. 6 and 7, details in section and on an enlarged scale of the rubber sleeve before and after treatment with the machine shown in Figs. 1 to 5. Figs. 8, 9 and 10, details on an enlarged scale of the movable upper roller and a portion of the pressure devices coöperating therewith.

Referring to the drawings and particularly to Figs. 6 and 7, *a* represents a sleeve of unvulcanized material commonly known as rubber, and *b* a core or mandrel upon which the sleeve *a* is built or made up of the desired thickness or diameter. As now commonly practised in the manufacture of garden or like hose, the rubber sleeve *a* has wound upon it a wrapper *c* of cloth or like material, while the latter is damp or in a wet condition. The cloth wrapper *c* is usually wound upon the rubber sleeve *a* with a machine, which comprises essentially three rollers *d, e, f,* the rollers *d, e,* being associated so as to support the rubber sleeve *a* and its mandrel *b*, and the other roller *f* being capable of being moved toward and from the rollers *d, e,* so as to engage the rubber sleeve *a* and hold it in place between the rollers *d, e,* so as to insure the sleeve *a* being revolved, by the rollers *d, e,* and the wrapper *c* being wound thereon.

In the machines as now commonly made and known to me, the movable roller *f* exerts a pressure upon the rubber sleeve due to the weight of the said roller, and serves merely to insure sufficient contact of the rubber sleeve and the wrapper *c* with the supporting rollers *d, e* to wind the wrapper upon the rubber sleeve *a*, and as the wrapper is wound upon the rubber sleeve, the roller *f* is lifted by the increasing diameter of the wrapped rubber sleeve. This method of wrapping the rubber sleeve *a* is open to the objection that the rubber sleeve *a* remains practically unchanged as to its interior construction, and has its exterior surface more or less marked by the wrapper *c*, which frequently has pleats or folds formed in it, which are impressed on the exterior surface of the rubber sleeve *a* and become permanent defects or objectionable markings when the wrapped rubber sleeve is vulcanized.

The present invention avoids these objectionable features and improves the vulcanized rubber sleeve $a$ both interiorly and exteriorly, in that it causes the unvulcanized rubber sleeve to be compacted and rendered dense and firm during the wrapping process, so that the vulcanized rubber sleeve is stronger and free or substantially free from internal pores, gas bubbles or cavities, and so that the cloth wrapper is freed or substantially freed from wrinkles, pleats or folds while it is being wound upon the rubber sleeve $a$. To this end, provision is made for maintaining the roller $f$ in fixed position with relation to the rollers $d$ $e$, and in the present instance, the roller $f$ has coöperating with it devices which form practically a rigid or stationary abutment for the said roller, so that as the wrapper $c$ is wound upon the rubber sleeve $a$, the roller $f$ is not permitted to yield or move away from the supporting rollers $d$, $e$, but remains in a practically fixed position with relation to the supporting rollers, and consequently as the layers of the wrapper $c$ wound upon the rubber sleeve increase in number, the external pressure upon the rubber sleeve increases, and this increased pressure causes the rubber sleeve to be compressed and rendered smaller in diameter as illustrated in Fig. 7, wherein the rubber sleeve $a$ is shown as of less thickness than the uncompressed rubber sleeve $a$ shown in Fig. 6. Furthermore, as the wrapper $c$ is wound upon the rubber sleeve under an increasing pressure, the wrapper is rendered smooth and free or substantially free from wrinkles, pleats or folds, with the result that when the wrapped rubber sleeve $a$ is vulcanized, the exterior surface of the vulcanized rubber sleeve is smooth and free or substantially free from impressions or countersunk portions, which ordinarily are present when pleats, folds or wrinkles are formed in the wrapper.

In the present instance, I have shown one construction or arrangement of an abutment or backing device for the roller $f$, and while the construction herein shown may be preferred, it is not desired to limit the invention to the particular construction shown.

In the present instance, the roller $f$, which may be designated the pressure roller, is supported at a plurality of points in its length, by a plurality of sets of holding jaws 10, 12, (see Figs. 8 and 10), which are mounted to turn on the shafts 13, 14, of backing rolls 15, 16, carried by arms 17 on a rock-shaft 18 journaled in the framework 19 of the machine and provided with arms 20, which are connected by links 21 with the piston rods 22 of pistons (not shown), but which are movable in cylinders 23 supported by the framework 19.

The holding jaws 10, 12, are capable of being adjusted to engage rollers $f$ of different diameters, by means of threaded rods 24 carried by a boss 25 on one jaw as 10 and engaging a like boss 26 on the coöperating jaw 12. The arm 17 has attached to or forming part of it a block 27 (see Figs. 8, 9 and 10), having a flat upper surface on which rests a wedge block 28, which is provided with an inclined upper surface 29 with which coöperates a cam-shaped crank or arm 30 fast on a rock-shaft 31, which is journaled in the framework 19 of the machine and is provided in the present instance with a handle or crank 32 at one or both ends, by means of which the operator can turn the shaft 31 so as to engage the cam 30 with the inclined surface 29 of the wedge block after the manner represented in Fig. 5.

The pressure roller $f$ is moved into its lowered or operative position as herein shown, by means of air, steam or other fluid under pressure, which is admitted into the cylinders 23 through a pipe 34 common to them all (see Fig. 1), and which is connected by a pipe 35 with a source of fluid supply (not shown). The pipe 35 is provided with a suitable valve 36 by which the admission of fluid to and the exhaust from the cylinders 23 may be controlled, in a manner well understood, said valve being actuated by the operator through a rod 37 connected with a crank 38 on the valve stem 39. The roller $f$ may be returned to its inoperative or raised position shown in Fig. 4, as herein shown, by counterweights 40 connected by links 41 with cranks 42 on the rock-shaft 18.

Provision is made for feeding the wrapper $c$ from a table 43 to the rubber sleeve $a$ and for rotating the latter and the rollers $d$, $e$, $f$, and, in the present instance, the roller $e$ is positively driven from a main shaft 44 provided with a pulley 45, by a gear 46 on the main shaft, which meshes with a gear 47 normally loose on a counter shaft 48 and adapted to be rendered fast thereon by a suitable clutch member 49, which is movable by a lever 50 or by a foot treadle 51 into and out of engagement with the gear 47 in a manner well understood. The shaft 48 is connected with the roller $e$ by gearing comprising the gears 52, 53, pinions 54 and gears 55, the latter being fast on the roller $e$. The roller $f$ is also positively driven, which is effected as herein shown (see Fig. 3) by means of a gear 155 on the roller $f$, meshing with a gear 154 loose on the shaft 18 and having attached to it a sprocket wheel 156, connected by a link chain 157 with a sprocket wheel 158 on the shaft of a gear 153, which meshes with and is driven by the gear 152 on the shaft 48.

In operation with the apparatus herein shown, the mandrel $b$ having thereon a rubber sleeve $a$ of any desired length as, for instance, fifty feet, is placed in the machine so as to rest upon the rollers $d$, $e$. The cloth or other wrapper $c$, which is moistened in the tank 60 containing water, is then laid upon the table 43 and its front edge is smoothed out by hand and placed upon the roller $d$. The rod 37 is then moved by the operator to admit fluid pressure into the cylinders 23, so as to act on the pistons therein and lower the roller $f$ into contact with the rubber sleeve $a$ as represented in Fig. 5. The operator then moves the handle 32 so as to rock the shaft 31 and bring the cam 30 into engagement with the inclined surface of the wedge block 28. The machine is now in condition to start winding the wrapper $c$ upon the rubber sleeve $a$, which is effected by the operator throwing in the clutch member 49 so as to couple the continuously driven main shaft 44 with the countershaft 48, and thereby set the rollers $e$, $f$ in rotation, which rotate the rubber sleeve $a$ and through the latter rotate the roller $d$ in the proper direction to feed the wrapper and wind it upon the rubber sleeve. As the cloth wrapper is wound upon the rubber sleeve $a$ the diameter of the wrapped rubber sleeve is increased, and as the rollers $d$, $e$, $f$, have a constant relation to one another, owing to the fact that the three rollers are to all intents and purposes stationary, so far as movement away from one another is concerned, the increase in thickness of the layers of the wrapper causes an increase in external pressure applied to the rubber sleeve, and the latter yields inwardly and is compressed into a more dense, compact and firm or solid structure, which is retained substantially in its compressed condition by the wrapper during the process of vulcanizing to which the wrapped rubber sleeve is subjected.

The wrapped rubber sleeve is vulcanized in any suitable or known manner, and during the vulcanizing process the compacted and solidly wrapped rubber sleeve resists the formation of gas bubbles or cavities in the rubber under the influence of the vulcanizing heat, and, as a result, the vulcanized rubber sleeve is superior in its internal condition and is also superior in its external condition, because the non-movable condition of the rollers, serves to insure the wrapper $c$ being wound upon the rubber sleeve $a$ free or substantially free from wrinkles, pleats, folds, etc., with the result that the exterior surface of the vulcanized rubber sleeve is smooth and free or substantially free from markings, depressions or other imperfections.

In the machine herein shown, the roller $e$ is supported by auxiliary rollers 61, 62, carried by frames 63, which are movable, so that the roller $e$ may be adjusted toward and from the roller $d$ to permit rubber sleeves of different diameters within limits to be wrapped upon the machine. In the present instance, the frames 63 are pivoted to the framework and adjusted by cams or eccentrics 64 on a shaft 65 (see Figs. 4 and 5), which is capable of being rotated by a hand wheel 66 on a shaft 67 provided with a worm (not shown), but which meshes with a worm gear 68 on the shaft 65 (see Fig. 2).

The wedge block 28 is capable of being adjusted on its supporting block 27 to compensate for differences in the diameters of the rubber sleeves $a$, which adjustment may be effected by means of a slot 70 in the wedge block through which extends a clamping bolt 71.

As the roller $f$ is moved in a circular path with the rock-shaft 18 as a center, the gear 155 rolls on the gear 154, which latter is held from rotation by the link chain 157 and sprocket wheels 156, 158.

By the term "rubber" as employed in the claims, I desire to include pure rubber and its compositions or compounds, such as now found on the market under the name of rubber.

I have herein shown one embodiment of the invention, but it is not desired to limit the invention to the particular construction shown.

Claims:

1. In an apparatus for winding a wrapper of flexible material upon an unvulcanized rubber sleeve, in combination, rollers to support the rubber sleeve, a pressure roller movable toward and from said supporting rollers and arranged to engage the rubber sleeve when the latter is bearing against said supporting rollers, a carrier for said pressure roller in which the latter has a fixed bearing while permitting said roller to revolve, mechanism for bodily moving said carrier, and means coöperating with said carrier for maintaining the pressure roller in fixed position with relation to said supporting rollers while a wrapper is being wound upon the rubber sleeve by said rollers.

2. In an apparatus for winding a wrapper of flexible material upon an unvulcanized rubber sleeve, in combination, rollers to support the rubber sleeve, a pressure roller movable toward and from said supporting rollers and arranged to engage the rubber sleeve when the latter is bearing against said supporting rollers, a wedge block movable with said pressure roller toward and from said supporting rollers, a rock shaft, and a cam on said rock-shaft to engage said wedge block and maintain the pressure roller in fixed position with relation to said supporting rollers while a wrapper is being wound upon the rubber sleeve by said rollers, and means for positively rotating one of said rollers.

3. In an apparatus for winding a wrapper of flexible material upon an unvulcanized rubber sleeve, in combination, rollers to support the rubber sleeve, a pressure roller movable toward and from said supporting rollers and arranged to engage the rubber sleeve when the latter is bearing against said supporting rollers, a movable carrier for said pressure roller, in which the latter has a fixed bearing while permitting the said pressure roller to revolve, a rock-shaft, and a backing device for said pressure roller, comprising a member movable with said carrier and a member movable with said rock-shaft.

4. In an apparatus for winding a wrapper of flexible material upon an unvulcanized rubber sleeve, in combination, rollers to support the rubber sleeve, a pressure roller movable toward and from said supporting rollers and arranged to engage the rubber sleeve when the latter is bearing against said supporting rollers, a movable carrier for said pressure roller, in which the latter has a fixed bearing while permitting the pressure roller to revolve, and means coöperating with said carrier for maintaining the pressure roller in fixed position with relation to the supporting rollers while a wrapper is being wound upon the rubber sleeve by said rollers.

5. In an apparatus of the character described, in combination, a plurality of rollers to engage the article to be wrapped, one of said rollers being movable toward and from the other rollers, a carrier for said movable roller in which the latter has a fixed bearing while permitting it to revolve, means for effecting revolution of said rollers and the article to be wrapped, and means coöperating with said carrier for maintaining the said movable roller in fixed position with relation to the other rollers while a wrapper is being wound upon the said article to cause the latter to be compressed externally as the wrapper is wound upon it and to permit said movable roller to be bodily moved toward and from its coöperating rollers.

6. In an apparatus for winding a wrapper of flexible material upon an unvulcanized rubber sleeve, in combination, rollers to support the rubber sleeve, means for adjusting one of said rollers toward the other to adapt the rollers to rubber sleeves of different diameters, a pressure roller movable toward and from said supporting rollers and arranged to engage the rubber sleeve when the latter is bearing against said supporting rollers, a movable carrier for said pressure roller in which the latter has a fixed bearing, and means for maintaining the said pressure roller in fixed position with relation to the supporting rollers for the purpose specified.

7. In an apparatus for winding a wrapper of flexible material upon an unvulcanized rubber sleeve, in combination, rollers to support the rubber sleeve, a pressure roller movable toward and from said supporting rollers, a movable carrier for said pressure roller provided with adjustable jaws to engage and support said pressure roller in fixed relation to said carrier while permitting said pressure roller to revolve, and means coöperating with said carrier for maintaining said pressure roller in fixed position with relation to the supporting rollers for the purpose specified.

In testimony whereof, I have signed my name to this specification.

WILLIAM P. McGEOUCH.